United States Patent [19]

Kohring et al.

[11] Patent Number: 4,764,033

[45] Date of Patent: Aug. 16, 1988

[54] OIL FILM DAMPER

[75] Inventors: Mark D. Kohring, West Chester; Edward J. Bailey, Cincinnati, both of Ohio

[73] Assignee: Cincinnati Milacron, Inc., Cincinnati, Ohio

[21] Appl. No.: 13,361

[22] Filed: Feb. 11, 1987

[51] Int. Cl.[4] ............................................. F16C 27/00
[52] U.S. Cl. ......................................................... 384/99
[58] Field of Search ................ 384/99, 101, 102, 537, 384/467

[56] References Cited

U.S. PATENT DOCUMENTS

| | | | |
|---|---|---|---|
| 3,709,379 | 1/1973 | Kaufeldt | 214/1 BB |
| 3,759,588 | 9/1973 | Anderson | 384/101 |
| 3,980,358 | 9/1976 | Davis | 384/99 |
| 4,116,501 | 9/1978 | Mötz et al. | 384/99 |
| 4,606,667 | 8/1986 | Bailey | 403/117 |
| 4,642,212 | 2/1987 | Bailey | 264/262 |

*Primary Examiner*—Lenard A. Footland
*Attorney, Agent, or Firm*—Frost & Jacobs

[57] ABSTRACT

There is provided a rotator bearing shock and vibration dampener for the rotator bearing of a robotic manipulator, with such shock dampener including a stationary robot base and a rotary turntable, and a large rotary turntable bearing having its inner race bolted to the stationary base and its outer race bolted to the rotary turntable. An oil damp well space having a relatively thin, predetermined depth squared relative its surface area is formed in the base below the outer race and in the turntable above the inner race. A predetermined volume of damping oil is located adjacent the turntable bearing in the base and fills the oil damp well space, whereby the damping oil normally resides in the well space to provide an oil film therewithin. The well space is formed with relatively limited inlets and outlets for the damping oil such that the oil film tends to resist compression and displacement, thereby damping vibrations, mechanical shocks and jolts encountered by the robotic manipulator in use, and increasing the effective dynamic stiffness of the turntable relative to the base.

10 Claims, 2 Drawing Sheets

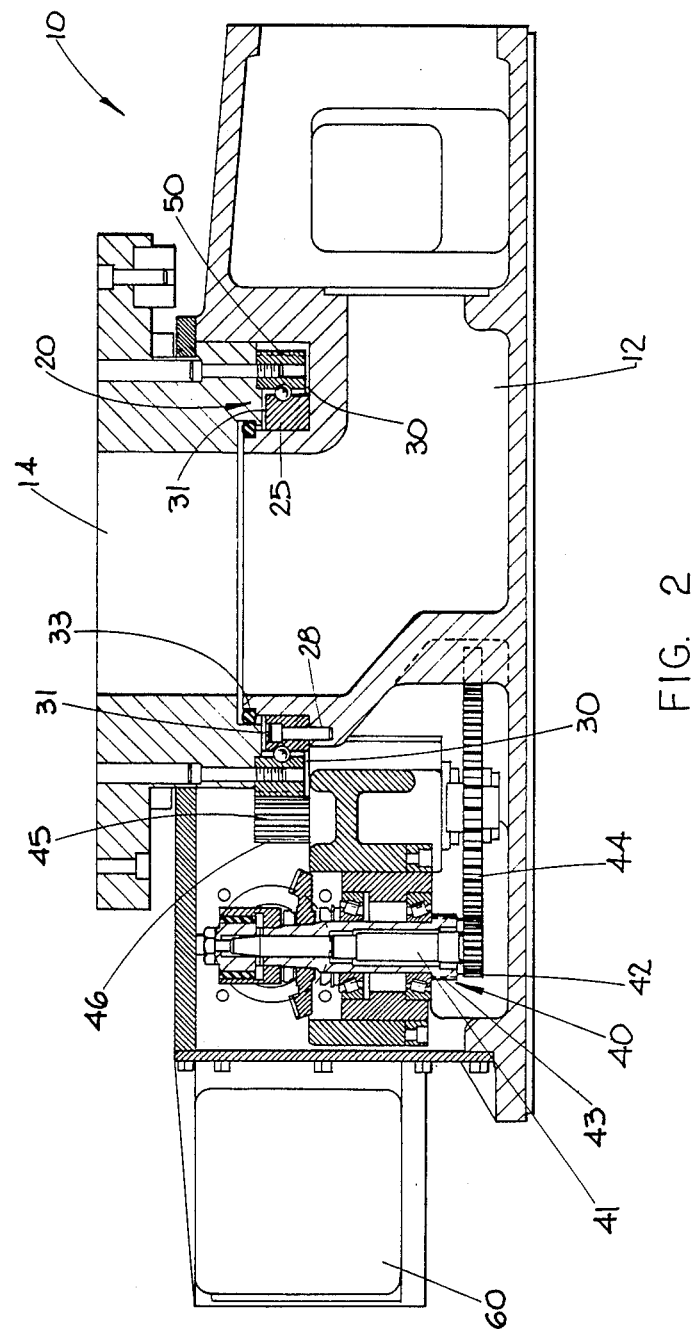

OIL FILM DAMPER

TECHNICAL FIELD

This invention relates to a shock dampener for moving parts of a robotic manipulator, and, more particularly, to a rotator bearing shock dampener for the main bearing in the base of a robotic manipulator.

BACKGROUND ART

Most robotic manipulator structures include some type of base member which is often immovably connected to a mounting in a floor or similar structure, and a turret or turntable portion which rotates relative the base member to alter the position of the payload or working portion of the robotic manipulator. Quick starts and stops of such rotating turntable, as well as sudden changes in the effective loading of extendable robotic arms and the like, often transfer the impact of such movements in the form of sudden shocks and vibrations in the form of rocking vibrations and shocks to said turntable, and more particularly to the main bearing of the base. Additionally, external vibrations and shocks can be imposed on a robotic manipulator, such as by other equipment operating nearby. Due to the inherent compliances and clearances within the interacting parts at the interface of the turntable and the base (especially at the main bearing thereof), often a limited amount of displacement can be introduced into the system by such various shocks, vibrations, and jolts. In applications such as robotic manipulators where accurate and steady movement is often critical to successfully accomplishing the task at hand, even a relatively small amount of backlash or slack can be very harmful. If the amount of compliance in a system is relatively substantial, the robotic manipulator is much less reliable and accurate in its functions and, possibly, inappropriate for delicate operations. In modern applications which rely immensely on operations which require precise movements, such slack or backlash becomes increasingly more intolerable.

An example of a relatively simple robotic arm having a bearing support is shown in U.S. Pat. No. 4,546,233, which issued to H. Yasuoka on Oct. 8, 1985. In particular, this patent describes an arc-welding robot which includes a stationary table fixed to a floor, and having a rotary table mounted for rotation thereon by a pair of bearings. As shown in the drawings, the bearings are spaced apart longitudinally to support the rotary table in a rotatable manner on the stationary table. While the Yasuoka structure includes a tension spring to reduce the load bearing on the arm tilting motor, it does not include any structure intended to dampen the inherent shocks and jolts which the rotary table will convey to the stationary table during normal use.

Similarly, U.S. Pat. No. 4,392,776, issued to L. Y. Shum on July 12, 1983, describes a robotic manipulator structure including a base which rotatably supports a first swinging arm for rotation relative thereto. The first swinging arm is carried at its proximate end by a hollow shaft which is supported for rotation relative the base by a pair of spaced bearings. Like the Yasuoka structure, the Shum robotic manipulator structure utilizes the main rotator bearings to support a rotatable manipulator structure without any means for damping the inherent shocks and jolts which the robot's moveable arm and rotatable mechanism will inherently impose on the stationary base thereof.

Consequently, despite the universal knowledge in the industry that unwanted displacement or compliances in the moving parts of a robot are becoming increasingly more intolerable as the need for precision increases, there remain problems in effectively and efficiently eliminating such inherent displacement or compliances resulting from shocks, jolts and vibrations commonly encountered by rotator bearings in the base of such robotic manipulators.

DISCLOSURE OF THE INVENTION

It is an object of this invention to obviate the above-described problems.

It is another object of the present invention to provide a damping device for a rotator bearing of a robotic manipulator in a relatively simple, inexpensive and reliable manner.

It is yet another object of the present invention to provide a rotator bearing shock and vibration dampener for the base main bearing of a robotic manipulator which utilizes an oil film damping arrangement to effectively increase the dynamic stiffness of such manipulator.

In accordance with one aspect of the present invention, there is provided a rotator bearing shock and vibration dampener for the base main bearing of a robotic manipulator, with such shock and vibration dampener including a robotic manipulator base having a main bearing race formed therein, and an oil damp well space having a relatively thin, predetermined depth relative its surface area formed within the base adjacent the bearing race. The shock dampener further includes a main bearing for the robotic manipulator which is fitted within the bearing race, and a robotic manipulator turntable mounted for rotation relative the base and being supported by the main bearing. A predetermined volume of damping oil surrounds the main bearing in the base and fills the oil damp well space, whereby the damping oil normally resides in the well space, and the well space is formed with relatively limited inlets and outlets for the damping oil such that the oil tends to resist compression and displacement, thereby damping vibrations, mechanical shocks and jolts encountered by the robotic manipulator in use, and increasing the effective dynamic stiffness of the turntable relative to the base.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 2 is a cross sectional view of the lower portions of the robotic manipulator shown in FIG. 1, and taken along lines 2—2 thereof.

DETAILED DESCRIPTION OF THE INVENTION

Figure 1:
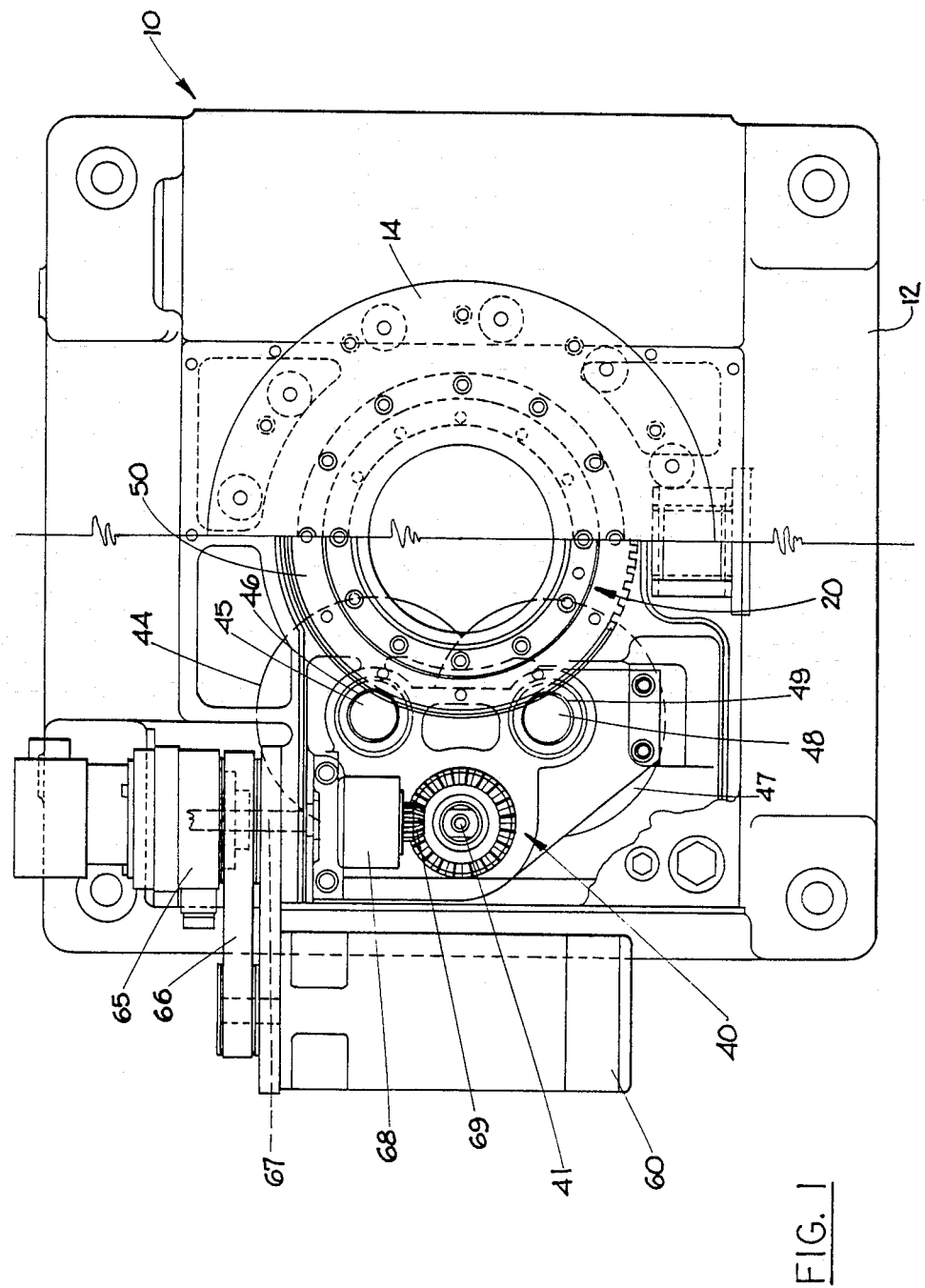
FIG. 1 is a top view, partially broken away, of the lower portion of a robotic manipulator including a base main bearing and a rotator bearing shock dampener of the subject invention.

Referring now to the drawings in detail, wherein like numerals indicate the same elements throughout the views, a top view of the lower portions of a robotic manipulator 10 is shown in the partially broken-away view of FIG. 1. In particular, a robotic manipulator base 12 is shown as including a drive gear assembly 40, which provides rotational input to the output driven gear 50, which serves to rotate the upper turret or turntable 14 of robotic manipulator 10 relative base 12. In particular, drive gear assembly 40 includes a main drive means 41 which receives rotational input from a rotational input means 60 (e.g. a servo-type motor) via rotational input transfer means 65. While rotational input transfer means 65 is shown as including a drive belt or chain 66, a drive shaft 67, drive transmission means 68 and bevel gear 69 to transfer such rotational input to main drive means 41, this structure is shown only as an example of the plethora of ways in which such rotation could be applied thereto. It is not critical how such rotational input is applied to main drive means 41.

As best illustrated in FIG. 2, rotational motion which is transferred from rotational input means 60 to main drive means 41 is, in turn, transferred to first drive gear 42 and second drive gear 43 integrally mounted on the lower distal end of main drive means 41. External gear teeth of first drive gear 42 mesh with corresponding gear teeth of transfer gear 44 (which can be a speed reduction gear), as shown in FIG. 2. Transfer gear 44 serves to transfer such rotational input from drive gear 42 to shaft 45 (upon which transfer gear 44 is mounted) and the integral rotator gear 46 at the upper end of shaft 45. Rotator gear 46 includes teeth which mesh with corresponding gear teeth of output driven gear 50 to thereby provide rotational movement to turret or turntable 14 relative base 12. Similarly, second drive gear 43 located above first drive gear 42 on main drive means 41 meshes with a second tranfer gear 47 (see FIG. 1) which transfers rotational input to a second shaft 48 and a second rotator gear 49 integrally connected to the upper end of shaft 48, which also meshes with output driven gear 50 to provide a dual drive system therefor. In this regard, it is contemplated that main drive means 41 can comprise two concentrically arranged shaft portions connected to first drive gear 42 and second drive gear 43, respectively, and connected together by means of a torsion elastic spring means located therebetween. It is further contemplated that the torsion elastic spring means can be preloaded with a predetermined amount of torque force such that first drive gear 42 and second drive gear 43 maintain constant torque force between the respective intermeshing teeth of their transfer gears, rotator gears, and the output driven gear 50. In this preloaded arrangement, first drive gear 42 and second drive gear 43 are simultaneously rotated by the single rotational input means 60 and its rotational input transfer means 65, as described above. This dual drive gear assembly is utilized to maintain such predetermined torque force at each gear interface throughout the system to eliminate backlash commonly encountered in robotic manipulator applications. This unique anti-backlash gear assembly is more fully described in the commonly owned, co-pending application entitled "Preloaded Anti-Backlash Gear Assembly," which was filed in the name of Edward J. Bailey on the same day as the present application, said application being hereby incorporated herein by reference. It should be noted that while such a dual drive gear assembly is preferred, the principles of the subject invention can equally be applied to a single or multiple drive gear system.

As best illustrated in FIG. 2, base 12 of robotic manipulator 10 is to be formed with a bearing race 25 adjacent its upper portion designed to provide adequate support for main rotator bearing 20 for rotatingly mounting turntable 14 to base 12. It is also contemplated that the lower outer portions of turntable 14 can be fitted with output driven gear 50. As shown in FIG. 2, main rotator bearing 20 is mounted in bearing race 25 between the outer periphery thereof and the inner periphery of output driven gear 50 which is attached to turntable 14. Output driven gear 50 includes external gear teeth about its outer periphery which are designed to correspond and mesh with the gear teeth of rotator gears 46 and 49 respectively, to provide rotational movement to turntable 14 relative base 12 in response to rotational input from input means 60 through drive gear assembly 40.

A closer look at the bearing race 25, bearing 20, and output driven gear 50 assembly of FIG. 2 further shows that formed adjacent such assembly are lower oil damp well space 30 and upper oil damp well space 31. In particular, oil damp well spaces 30 and 31 feature relatively small depth in relation to their surface area, and are located above and below main rotator bearing 20 and output driven gear 50 as mounted in robotic manipulator 10. Technically, a comparison of depth to surface area must be made by comparing the depth squared relative such surface area in order to keep the units of measurement compatible. Lower oil damp well space 30 is formed in base 12 below gear 50, while upper oil damp well space 31 is formed in turntable 14 above bearing race 25. The depth of these oil damp wells can vary for particular applications, but must be relatively thin when compared to the surface area over which such gap or space extends. In particular, these oil damp well spaces permit the maintenance of a thin oil film above bearing 20 and below output driven gear 50 in use. A resulting relatively wide but thin film of oil provides an oil film damper which can quite effectively dampen the inherent shocks, jolts, and vibrations at this turntable/base interface during normal robotic activities.

For example, it is contemplated that oil damp well spaces 30 and 31 might have a depth or thickness in a range of between about 0.003 inches and about 0.15 inches (e.g. about 0.076 millimeters and about 3.8 millimeters) for a surface area which is approximately one hundred and eighty times such depth (or about 18 square inches or 117 square centimeters). While these figures are simply provided as an example of the relative dimensions of oil damp well spaces 30 and 31, the exact numbers can vary according to the requirements of a particular application depending on variables such as oil viscosity, thickness of the well spaces, and surface area. It is critical, however, that the resulting oil films maintained within well spaces 30 and 31 be relatively thin in comparison with the surface area of such gaps to establish oppositely disposed oil films on the top of the bearing and on the bottom of the output driven gear. In use, because the oil held within oil damp well spaces 30 and 31 will have very limited inlet and outlet paths, upon imposition of shocks, jolts, and/or vibrations to bearing 20 and output driven gear 50 as a result of sudden movements or load variations or the like by the robotic manipulator and external vibrations and shocks imposed thereon, the oil within such damp well spaces cannot quickly move out of such spaces and inherently tends to resist compression, thereby effectively absorbing such energy input and providing additional dynamic stiffness to turntable 14 relative base 12. Because movement of the oil in to and out of the oil damp well spaces 30 and 31 will be restricted by the viscosity of the oil and the limited avenues of fluid communication between such well spaces and the larger reservoir of oil (not shown) in the base of a robot, these shock, jolt, and vibration forces will be dampened by the relatively slow moving oil.

It is contemplated that the limited avenues of movement of the oil to and from the oil damp well spaces 30 and 31 can comprise the inherent clearances within main rotator bearing 20 as mounted on bearing race 25 and the spaces between the gear teeth of output driven gear 50 of turntable 14. It is further contemplated that at least a portion of base 12 could be filled with gear oil to a level at least as high as the upper portion of upper oil well damp space 31 to provide a consistent source of oil to flow into and out of such well spaces. Such gear oil could also be utilized to lubricate drive gear assembly 40 as desired. In this regard, FIG. 2 illustrates an example of a seal 33 which might be of the O-ring type to provide sealing containment of the oil within base 12 at the turntable/base interface.

As mentioned above, the viscosity of the oil within the well spaces 30 and 31 in part determines the incremental amount of effective stiffness which the subject oil film damper provides to the robotic manipulator. In particular, higher viscosity oil would result in higher incremental effective stiffness in a given application. It is also contemplated that the depth of the oil damp well spaces can be varied, and the available avenues of entry and outlet of oil relative such well spaces could also be adjusted as desired. Obviously, a narrower well space and/or more restricted avenues of inlet and outlet of oil from such oil spaces would effectively increase the resulting stiffness. As an example, oil damp well spaces having a thickness and surface area within the ranges described above were successfully utilized and substantially increased the stiffness of a turntable 14 relative a base 12, wherein the output driven gear 50 had an approximate outside diameter of about 12 inches (or about 305 millimeters), and wherein the oil utilized was common SAE 90 weight gear oil.

In use, as turntable 14 is rotated about base 12, and as various other robotic manipulator parts are moved and achieve various tasks, various shocks, jolts and vibrations are commonly transferred from turntable 14 to base 12. In a robotic manipulator 10 having the oil film damping means shown and described herein, these unwanted forces tend to compress the oil within oil damp well spaces 30 and 31, respectively. As oil is substantially incompressible, such compressive forces act to squeeze the oil alternately in to and out of such well spaces. As described above, there are limited avenues of access relative such well spaces, and, therefore, the oil cannot move quickly enough to accommodate these compressive forces. Consequently, the slow moving oil acts to dampen or absorb such vibrations and forces as it is forced through the limited avenues of access of the respective well spaces. As a result, the oil damp well spaces serve to provide a dynamic damping ring above the inner race of the bearing and output below the outer race of the bearing and driven gear of the robotic manipulator improving the effective dynamic stiffness of the turntable 14 relative base 12 and greatly reducing unwanted displacement or compliance which can often be precipitated by such vibrations and the like. It should be noted that oil film dampers made in accordance herewith can be designed quite easily for custom applications whereby the controlled area of the oil film damp well spaces can be adjusted relative the depth of such spaces, as well as in light of the oil viscosity to be utilized, and the avenues of inlet and outlet for such oil relative such well spaces. Such oil film dampers are quite effective in substantially increasing the effective dynamic stiffness of a robotic turntable relative its base in a relatively simple and economic manner.

Having shown and described the preferred embodiment of the present invention, further adaptions of the oil film damper structure can be accomplished by appropriate modification of such structure by one of ordinary skill in the art without departing from the scope of the present invention. For example, the subject oil film damper structure could be utilized in any rotator bearing location in a robotic manipulator having a base portion with a bearing race formed therein, and a turntable portion mounted for rotation relative such base, where routine shocks and vibrations negatively impact on the effective stiffness of the rotating part relative its base. While the base portion may be an actual base member of a robotic manipulator, as illustrated in the figures, it should be noted that the term "base" is used herein to connote any portion of a robotic manipulator which provides a rotator bearing attachment of a moving part (i.e. a turntable portion) for rotation relative thereto. Accordingly, the scope of the present invention should be considered in terms of the following claims, it is understood not to be limited to the details of structure and operation shown and described in the specification and drawings.

We claim:

1. A rotator bearing shock and vibration dampener for a rotator bearing of a robotic manipulator comprising:
   (a) a robotic manipulator base having a bearing race formed therein, and an oil damp well space having a relatively thin predetermined depth squared relative its surface area formed within said base adjacent said bearing race;
   (b) a bearing being fitted within said bearing race;
   (c) a robotic manipulator turntable mounted for rotation relative said base on said main bearing; and
   (d) a predetermined volume of damping oil adjacent said bearing in said base and filling said oil damp well space, whereby said damping oil normally resides in said well space to provide an oil film therewithin, and said well space is formed with relatively limited inlets and outlets for said damping oil such that said oil film tends to resist compression and displacement, thereby damping vibrations, mechanical shocks and jolts encountered by said robotic manipulator in use and increasing the effective dynamic stiffness of said turntable relative said base.

2. The shock dampener of claim 1, wherein said oil damp well space has upper and lower portions located respectively above and below said bearing race and turntable such that said oil film normally resides above said main bearing and below a portion of said turntable, said well space having a relatively thin predetermined depth squared relative its surface area with relatively limited oil inlets and outlets placing said upper and lower portions in fluid communication.

3. The shock dampener of claim 2, wherein said limited oil inlets and outlets comprise the inherent clearances within said bearing located therewithin and the spaces between gear teeth of the rotator gear of said turntable.

4. The shock dampener of claim 3, wherein the effective availability of said oil inlets and outlets is matched with the viscosity of said damping oil within said well space to achieve a predetermined effective stiffness of said turntable relative said base.

5. The shock dampener of claim 4, wherein said predetermined depth of said oil film within said well space is in a range of between approximately 0.076 mm and about 3.8 mm for a surface area of about 117 cm$^2$.

6. A bearing shock dampener for use in the base of a robotic manipulator, said shock dampener comprising:
 (a) a robotic manipulator base having a main bearing race formed therein, and an oil damp well space formed within said base adjacent said bearing race;
 (b) a main bearing for said robotic manipulator fitted within said bearing race;
 (c) a robotic manipulator turntable mounted for rotation relative said base on said main bearing;
 (d) a predetermined volume of damping oil adjacent said main bearing and filling said oil damp well space to provide an annular oil film therewithin; and
 (e) said well space having an upper portion and a lower portion located respectively above said bearing race and below a portion of said turntable and each having a relatively thin predetermined depth squared relative its surface area, said oil normally residing in said well space and said well space having relatively limited inlets and outlets for said oil placing said upper and lower portions in fluid communication such that said oil film tends to resist compression and displacement, thereby damping vibrations and jolts encountered by said robotic manipulator in use and increasing the effective dynamic stiffness of said turntable relative said base.

7. The shock dampener of claim 6, wherein said limited oil inlets and outlets comprise the inherent clearances within said main bearing located therewithin and the spaces between gear teeth of the rotator gear of said turntable.

8. The shock dampener of claim 7, wherein the effective availability of said oil inlets and outlets is matched with the viscosity of said damping oil within said well space to achieve a predetermined effective stiffness of said turntable relative said base.

9. The shock dampener of claim 8, wherein said predetermined depth of said oil film within said well space is in a range of between approximately 0.076 mm and about 3.8 mm for a surface area of about 117 cm$^2$.

10. A rotator bearing shock and vibration dampener for a rotator bearing of a robotic manipulator comprising:
 (a) a robotic manipulator base having a bearing race formed therein, and an oil damp well space formed within said base adjacent said bearing race;
 (b) a bearing being fitted within said bearing race;
 (c) a robotic manipulator turntable mounted for rotation relative said base on said main bearings;
 (d) a predetermined volume of damping oil adjacent said bearing in said base and filling said oil damp well space to provide an annular oil film therewithin; and
 (e) said well space having an upper portion and a lower portion located respectively above said bearing race and below a portion of said turntable, and each having a relatively thin predetermined depth squared relative its surface area with relatively limited oil inlets and outlets placing said upper and lower portions in fluid communication, whereby said damping oil normally resides in said well space, and wherein the number, size and location of said inlets and outlets for said damping oil are matched with the viscosity of said oil to achieve a predetermined damping system such that said oil film tends to resist compression and displacement, thereby damping vibrations, mechanical shocks and jolts encountered by said robotic manipulator in use and increasing the effective dynamic stiffness of said turntable relative said base.

* * * * *